US012563018B2

(12) United States Patent  (10) Patent No.: US 12,563,018 B2
Garg et al.  (45) Date of Patent: Feb. 24, 2026

(54) METHODS FOR A VIRTUAL PRIVATE NETWORK (VPN) CLIENT OPERATING AS A PASS-THROUGH VPN CLIENT FOR PRIVATE APPLICATIONS

(71) Applicant: Cisco Technology, Inc., San Jose, CA (US)

(72) Inventors: Rashmi Garg, Pleasanton, CA (US); Arun Kishore Narasani, San Jose, CA (US); Jia Fu Wu, Coquitlam (CA); Hien Thai, Elk Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 20 days.

(21) Appl. No.: 18/778,658

(22) Filed: Jul. 19, 2024

(65) Prior Publication Data

US 2026/0025362 A1  Jan. 22, 2026

(51) Int. Cl.
*H04L 9/40* (2022.01)

(52) U.S. Cl.
CPC ...... *H04L 63/0272* (2013.01); *H04L 63/0236* (2013.01); *H04L 63/029* (2013.01)

(58) Field of Classification Search
CPC ....................... H04L 63/0272; H04L 63/0236; H04L 63/029
See application file for complete search history.

(56) References Cited

U.S. PATENT DOCUMENTS

2011/0277026 A1  11/2011  Agarwal et al.
2020/0252374 A1   8/2020  Bosch et al.

| | | | |
|---|---|---|---|
| 2021/0314301 A1* | 10/2021 | Chanak | ................. H04L 9/0894 |
| 2021/0377222 A1* | 12/2021 | Sharma | ................. H04L 63/029 |
| 2022/0029965 A1 | 1/2022 | Chanak et al. | |
| 2023/0012224 A1 | 1/2023 | Kumar et al. | |
| 2024/0098061 A1 | 3/2024 | Wondra | |
| 2024/0187371 A1 | 6/2024 | Jain et al. | |
| 2024/0406027 A1* | 12/2024 | Fray | ................... H04L 12/4633 |

OTHER PUBLICATIONS

Zscaler Inc: "Zscaler Private Access", Data Sheet, 2021, 4 pages.
International Search Report and Written Opinion for International Application No. PCT/US2025/037515, mailed Oct. 28, 2025, 11 Pages.

* cited by examiner

*Primary Examiner* — Bryan Y Lee

(74) *Attorney, Agent, or Firm* — Polsinelli P.C.

(57) ABSTRACT

A method is disclosed wherein a device registers with a Secure Service Edge (SSE) upon VPN client startup to receive a policy configuring the client as a forwarding agent. The policy designates a Domain Name System (DNS) and data packet route. A tunnel is established between an Application Connector (ACA) agent and an Application Connector Gateway (ACG). Upon receiving a data packet via the ACG containing a request with an application destination, the device checks for an existing flow at the ACG. If none exists, the device identifies the ACA in the Application Connector Gateway Group (ACAG), replacing the packet's IP address with the ACA's. The device routes the packet through the tunnel to the identified ACA, which directs it to the application. This method optimizes routing efficiency and ensures seamless connectivity between devices and applications.

20 Claims, 5 Drawing Sheets

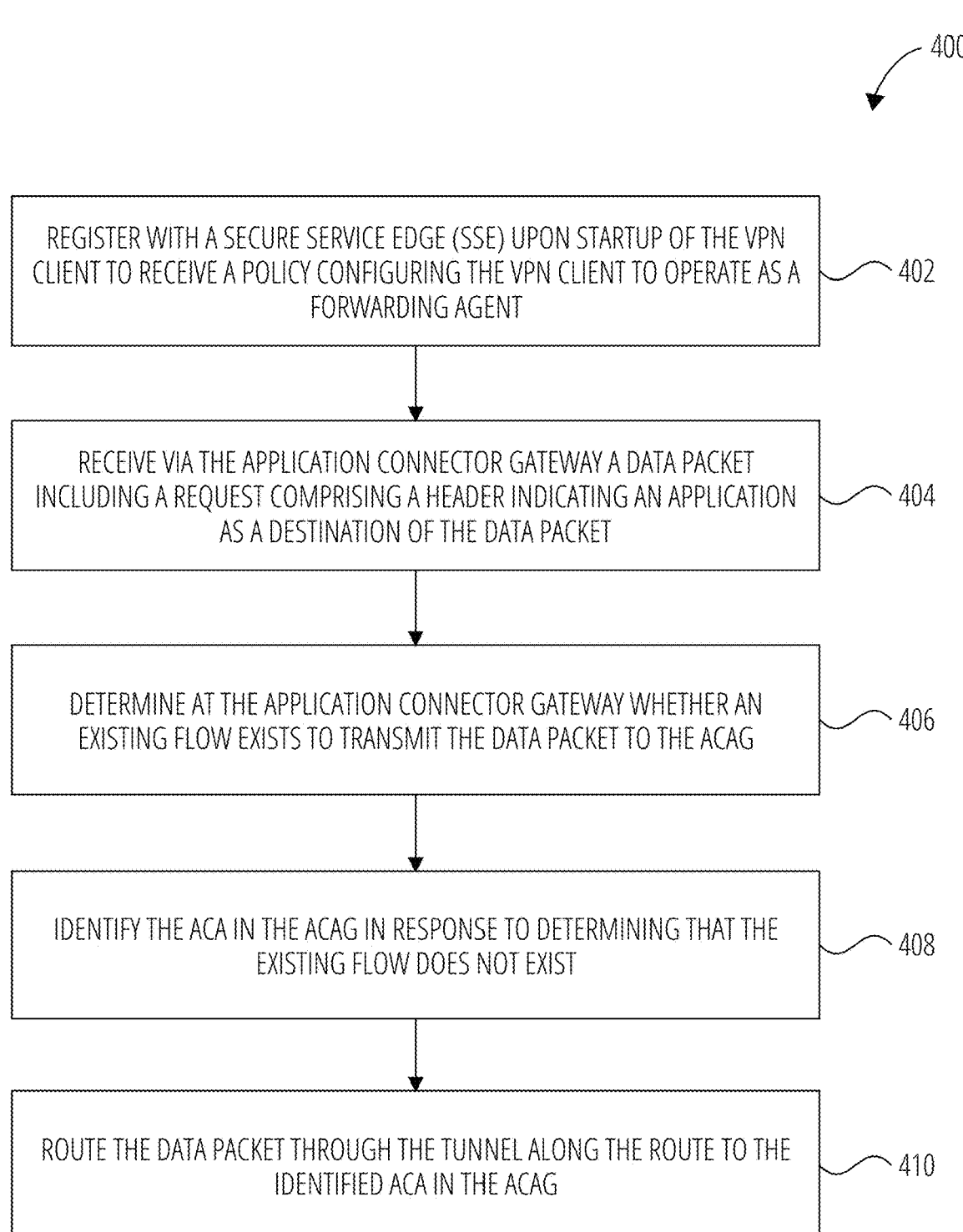

REGISTER WITH A SECURE SERVICE EDGE (SSE) UPON STARTUP OF THE VPN CLIENT TO RECEIVE A POLICY CONFIGURING THE VPN CLIENT TO OPERATE AS A FORWARDING AGENT ~402

RECEIVE VIA THE APPLICATION CONNECTOR GATEWAY A DATA PACKET INCLUDING A REQUEST COMPRISING A HEADER INDICATING AN APPLICATION AS A DESTINATION OF THE DATA PACKET ~404

DETERMINE AT THE APPLICATION CONNECTOR GATEWAY WHETHER AN EXISTING FLOW EXISTS TO TRANSMIT THE DATA PACKET TO THE ACAG ~406

IDENTIFY THE ACA IN THE ACAG IN RESPONSE TO DETERMINING THAT THE EXISTING FLOW DOES NOT EXIST ~408

ROUTE THE DATA PACKET THROUGH THE TUNNEL ALONG THE ROUTE TO THE IDENTIFIED ACA IN THE ACAG ~410

FIG. 4

METHODS FOR A VIRTUAL PRIVATE NETWORK (VPN) CLIENT OPERATING AS A PASS-THROUGH VPN CLIENT FOR PRIVATE APPLICATIONS

FIELD OF THE TECHNOLOGY

The field of technology for this patent application relates to methods for a utilizing a virtual private network (VPN) client acting as an application connector agent (ACA) to provide access to an application located behind it.

BACKGROUND

Enterprises leverage client software applications for remote access to corporate networks via VPN to enable secure connectivity for employees working outside the traditional office environment. By deploying robust VPN solutions, organizations ensure encrypted communication channels, safeguarding sensitive data from unauthorized access or interception. Through the integration of VPN clients with corporate network infrastructure, employees can securely access internal resources, including applications, servers, and databases, regardless of their physical location. This remote access capability empowers workforce flexibility, enabling employees to collaborate and perform tasks efficiently while adhering to stringent security policies and compliance requirements.

BRIEF DESCRIPTION OF THE SEVERAL VIEWS OF THE DRAWINGS

Details of one or more embodiments of the subject matter described in this disclosure are set forth in the accompanying drawings and the description below. However, the accompanying drawings illustrate only some typical embodiments of this disclosure and are therefore not to be considered limiting of its scope. Other features, embodiments, and advantages will become apparent from the description, the drawings, and the claims.

FIG. 4 illustrates a process for utilizing a virtual private network (VPN) client acting as an application connector (ACA) agent to provide access to an application located behind it in accordance with some embodiments of the present technology.

DETAILED DESCRIPTION

Figure 1:
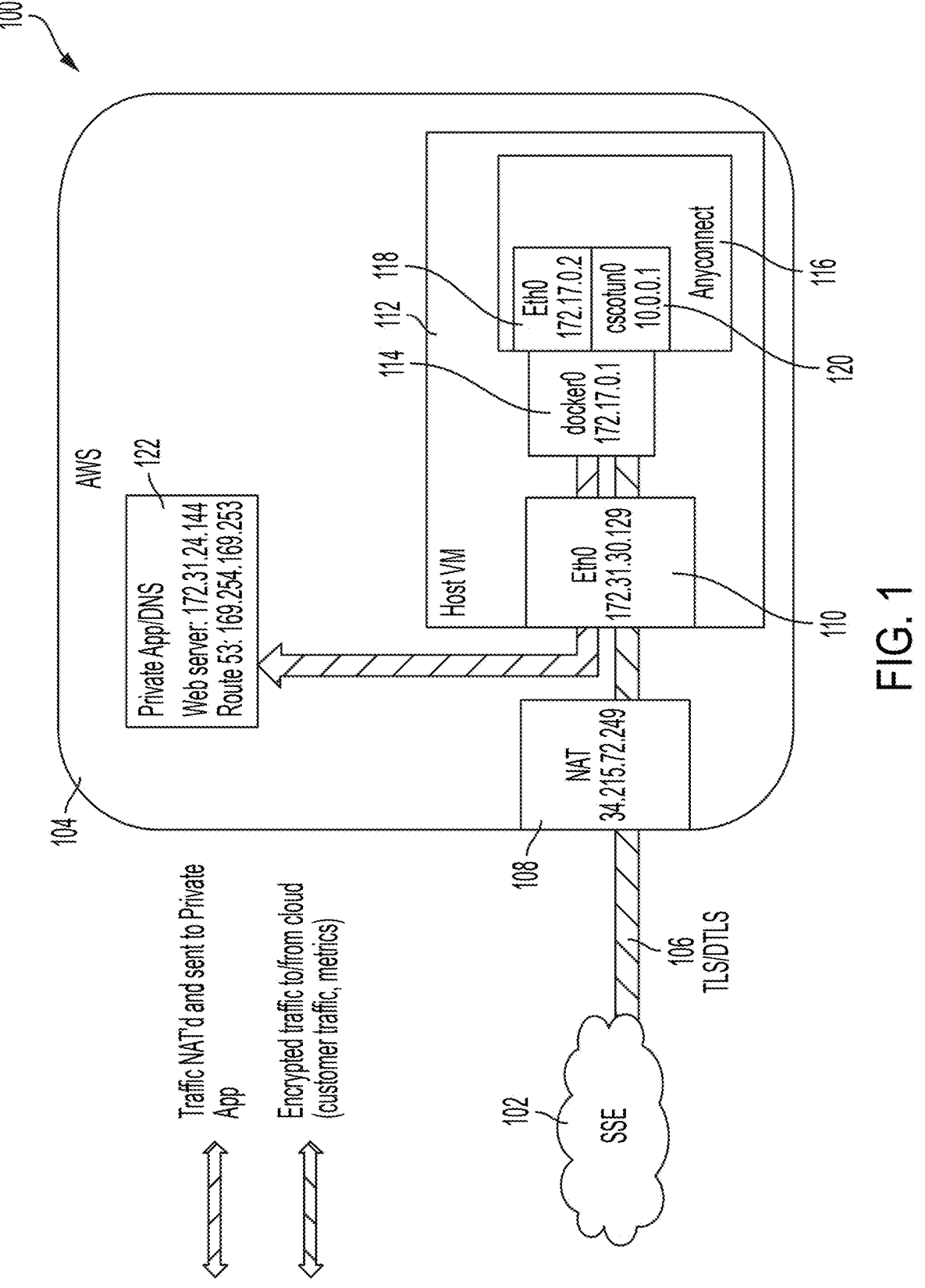
FIG. 1 illustrates an example architecture of a virtual private network (VPN) client in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or some embodiments in the present disclosure may be references to the same embodiment or any embodiment; and such references mean at least one of the embodiments.

Reference to "one embodiment" or "some embodiments" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

A VPN client/application is typically a versatile software tool designed to facilitate secure Virtual Private Network (VPN) access for remote users to corporate networks, regardless of their location. It empowers employees to establish encrypted connections to the company's network from remote offices, home offices, or while on the go, ensuring data confidentiality and protection against unauthorized access. While the current iteration of VPN client/application operates as an agent on end terminals, initiating and terminating connections, there is a need for an advanced connectivity solution capable of securely providing connectivity to private resources, in addition to private applications across diverse network environments, spanning from on-premises infrastructure to cloud-hosted environments or VMware setups. Thus, the imperative arises for establishing secure communication channels between agents and gateways, facilitating, for example, seamless access to private applications irrespective of their hosting environment.

Accessing private resources across diverse network environments, ranging from on-premises infrastructure to cloud-hosted environments, presents several challenges. These challenges include ensuring network compatibility, managing latency and performance issues, maintaining consistent security measures and compliance standards, addressing scalability and resilience concerns, managing the complexity of network configurations, and ensuring interoperability between different network technologies. These challenges are further exacerbated by the absence of specific policies governing the access of private resources existing behind the VPN client. Without predefined policies, organizations face increased risks of unauthorized access, security breaches, compliance violations, and operational inefficiencies.

Another challenge related to accessing private resources via VPN clients is the ease of installation, downloading, and implementation of policies. Ensuring that VPN clients are equipped with the necessary policies for accessing private resources across diverse network environments requires streamlined processes for policy distribution and implementation. However, complexities may arise due to differences in VPN client configurations, network architectures, and policy management systems.

The proposed solution addresses the above challenges by leveraging a VPN client as a router, functioning as a pass-through agent to enable access to applications situated behind the VPN client agent. By adopting this approach, the VPN client assumes the role of a lightweight SDWAN router, establishing a bidirectional connection rather than terminating at a network node. Employing a VPN client as a router offers several key functionalities, including Network Address Translation (NAT) on the Agent side, leveraging IP forwarding to operate as a pass-through VPN client, and supporting all form factors such as docker and VM deployments.

The VPN client is a useful tool that can help users access private resources that are hidden behind a client, ensuring their privacy and security. For instance, when installed on a laptop, the VPN client can enable users to establish secure connections. To achieve this, the VPN client is deployed on the customer's on-premises site within a docker container, which ensures that private resources remain hidden from the Internet and unauthorized users behind app connector gateways and agents.

When a user wants to connect to a private app, the VPN client establishes a tunnel, which allows the user to access the desired application seamlessly. This approach guarantees the existence of a secure tunnel as long as the VPN client is operational, facilitating efficient and secure access to private resources.

For example, to establish a pass-through VPN client connection, a VPN client is deployed to link the client on-premises with the on-premises data center and the broader network. This process initiates with the VPN client conducting a lookup for the desired application and the client's DNS server to ascertain the application's address. Upon obtaining the application's address, both the source and destination NAT are to be accessed. The sequence begins with a DNS request from the VPN client to the proxy, followed by the ZT proxy receiving the client request. Subsequently, the front-end router (Frouter) intercepts the request and directs the packet to the firewall for inspection. After inspection, the Frouter routes the packet based on the inner destination IP and forwards it to the corresponding application connector gateway group (ACAG). The resource connector gateway maintains a comprehensive list of all connected application connector (AC) agents (ACA) and their respective ACAGs, then forwards the packet to the assigned ACAG. Finally, the assigned ACAG facilitates the transmission of the packet to the intended application, thereby establishing a seamless pass-through VPN client connection.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims or may be learned by the practice of the principles set forth herein.

Overview

Leveraging VPN agents/clients as routers within the network infrastructure presents a transformative approach to facilitating seamless access to network applications in an enterprise cloud network. By integrating VPN agents/clients into the network routing architecture, organizations can establish secure communication pathways between remote users and cloud-based applications hosted within the enterprise infrastructure.

In some embodiments, the techniques described herein relate to a method for utilizing a virtual private network (VPN) client acting as an application connector (ACA) agent to provide access to an application located behind it, the method including: registering with a secure service edge (SSE) upon startup of the VPN client to receive a policy configuring the VPN client to operate as a forwarding agent, the policy designating a domain name system (DNS), and a route for data packets to follow, wherein a tunnel is created between the application connector (ACA) agent and an resource connector gateway; receiving via the resource connector gateway a data packet including a request including a header indicating the application as a destination of the data packet, wherein the header includes an Internet protocol (IP) address associated with an resource connector gateway group (ACAG) configured to enable connectivity to the application; determine at the resource connector gateway whether an existing flow exists to transmit the data packet to the ACAG; in response to determining that the existing flow does not exist, identifying the ACA in the ACAG, wherein the IP address in the header is replaced with a second IP address that identifies the ACA as an intended destination to route the data packet; and routing the data packet through the tunnel along the route to the identified ACA in the ACAG, wherein the ACA within the ACAG routes the data packet to the application.

In some embodiments, the techniques described herein relate to a method, wherein the application is configured at a domain name service using one or more of a fully qualified domain name (FQDN), wildcard, or subnets to identify the application, and map the application to at least one ACAG including of a plurality of ACAs.

In some embodiments, the techniques described herein relate to a method, further including generating at the resource connector gateway a mapping to the ACAG defining the route from a proxy at the resource connector gateway to the ACAG for the data packet to follow, the mapping defining one or more weights and priorities with regards to one or more ACAs in the ACAG.

In some embodiments, the techniques described herein relate to a method wherein the resource connector gateway further includes an IP address allocator, the IP address allocator configured to: preserve one or more ACAG IP addresses; and in response to additional ACAGs being created assigning at least one of the ACAG IP addresses to the additional ACAGs.

In some embodiments, the techniques described herein relate to a method, further including broadcasting to a proxy in the SSE one or more destination IP addresses associated with ACAs connected with one or more applications, wherein the proxy is configured to write the one or more destination IP addresses to the header in the request upon being provoked to connect to the application.

In some embodiments, the techniques described herein relate to a method, wherein identifying the ACAG associated with the ACA includes selecting one or more ACAs to serve the request, wherein the selecting includes determining whether either of the ACAs has exceeded a load threshold.

In some embodiments, the techniques described herein relate to a method, further including determine that a destination application is nested behind multiple ACAGs; and selecting the ACAG based on a location of the ACAG in proximity to a proxy at the SSE.

In some embodiments, the techniques described herein relate to a network device including: one or more memories having computer-readable instructions stored therein; and one or more processors configured to execute the computer-readable instructions to: register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector (ACA) agent and an resource connector gateway; receive via the resource connector gateway a data packet including a request including a header indicating an application as a destination of the data packet, wherein the header includes an Internet protocol (IP) address associated with an application connector gateway group (ACAG) configured to enable connectivity to the application; determine at the resource connector gateway whether an existing flow exists to transmit the data packet to the ACAG; in response to determining that an existing flow does not exist, identify the ACA in the ACAG, wherein the IP address in the header is replaced with a second IP address that identifies the ACA as an intended destination to route the data packet; and route the data packet through the tunnel along the route to the identified ACA in the ACAG, wherein the ACA within the ACAG routes the data packet to the application.

In some embodiments, the techniques described herein relate to a non-transitory computer-readable storage medium including computer-readable instructions, which when executed by one or more processors of a network appliance, cause the network appliance to: register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector (ACA) agent and an resource connector gateway; receive via the resource connector gateway a data packet including a request including a header indicating an application as a destination of the data packet, wherein the header includes an Internet protocol (IP) address associated with an application connector gateway group (ACAG) configured to enable connectivity to the application; determine at the resource connector gateway whether an existing flow exists to transmit the data packet to the ACAG; in response to determining that the existing flow does not exist, identify the ACA in the ACAG, wherein the IP address in the header is replaced with a second IP address that identifies the ACA as an intended destination to route the data packet; and route the data packet through the tunnel along the route to the identified ACA in the ACAG, wherein the ACA within the ACAG routes the data packet to the application.

The following description is directed to certain implementations for the purposes of describing innovative embodiments of this disclosure. However, a person having ordinary skill in the art will readily recognize that the teachings herein can be applied in a multitude of different ways.

Example Embodiments

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

FIG. 1 illustrates an example system including a virtual private network (VPN) client being used to provide connectivity to a network for an application in accordance with some embodiments of the present technology.

As shown in FIG. 1, resource connector gateways 116 can be utilized by Enterprises in network environments to secure remote access and to provide endpoint management between a cloud network a network resources such as private application 122, and private resources. By utilizing resource connector gateway 116, enterprises can facilitate secure remote access to enterprise networks by mitigating the risk of unauthorized access and data breaches, enabling users to connect to corporate resources securely from any location. Moreover, the resource connector gateway 116 incorporates a VPN client for establishing secure connections over the Internet.

Resource connector gateway 116 is set up to securely receive and send encrypted traffic through TLS/DTLS 106. This allows for safe communication with an SSE 102 cloud network. Security service edge (SSE) 102 is a security stack of secure access service edge SASE (that also includes a networking stack including SD-WAN). SSE 102 can allow organizations to protect their workforce from Internet threats, provide secure and adaptive access to private corporate applications, and protect data across all their cloud platforms and applications. In some cases, SSE 102 can help merge multiple security components into a cohesive framework. The components can then be deployed to both central and edge locations within the network to improve efficiency and response times to security threats.

The SSE 102 has a Cloud Control Layer at its core, which serves as the command center for managing security policies and configurations across the network. This layer includes an advanced administration dashboard that provides real-time insights into network activity and threats. It also has tools for policy management, which makes it easy to create, deploy and enforce security protocols across the different nodes of the network.

Each Data Processing Node in the system is strategically placed at the network's edge locations to effectively handle data processing demands close to data ingress points. These nodes come equipped with advanced security capabilities, such as data loss prevention systems, intrusion detection systems, and comprehensive malware scanning tools. By situating these nodes at the edge, the system ensures that security measures are applied effectively where data is accessed. Thus, helping to reduce latency and improve the overall speed and responsiveness of the network.

SSE 102 consists of several components, including the Secure Web Gateway (SWG), which is present in each node. The SWG plays a crucial role in filtering and monitoring all incoming and outgoing Internet traffic, ensuring that all web-based interactions comply with the organization's security policies. The SWG blocks access to malicious or unauthorized websites and content, thus preventing web-based threats from penetrating the network.

Another critical component of SSE 102 is the Cloud Access Security Broker (CASB), which operates from the cloud control layer. The CASB extends the system's visibility and control into the cloud environment, acting as a security liaison between on-premises infrastructure and cloud applications. The CASB enforces security policies across all cloud-based data exchanges, monitoring and controlling data traffic to ensure compliance with corporate security policies and regulatory requirements. The CASB effectively manages which cloud applications are accessed and the data that is transmitted.

In addition, SSE 102 also includes the Zero Trust Network Access (ZTNA) component, which is depicted in the figure. The ZTNA component adopts a "trust no one, verify everyone" approach, where no user or device is automatically trusted, irrespective of their location within or outside the network. This component ensures that all access to network resources is strictly authenticated and authorized, granting permissions based on the principle of least privilege.

For example, SSE 102 facilitates secure web and cloud usage, enabling users to access required information securely, whether it is general Internet content or corporate applications hosted in the cloud or delivered as SaaS. Thus, SSE 102 prevents unauthorized application access through adaptive access policies based on user risk, device posture, and user location.

In some enterprise examples, SSE 102 can cater to the needs of remote workers by offering secure connectivity and flexible access to private applications and private resources, irrespective of the device or location, employing both agent-based and agentless access methods. Thus, SSE 102 shields remote workers from Internet-based threats like ransomware and phishing attacks.

The resource connector gateway 116 connects with a private application 122 in virtual private network 104. Resource connector gateway 116 is capable of receiving incoming data traffic through TLS/DTLS 106. The resource connector gateway 116 then sends the received data traffic to the intended private application 122 as specified in the data traffic header of one or more data packets.

Upon startup, Resource connector gateway 116 receives instructions regarding the forwarding of data packets from TLS/DTLS 106. These instructions are derived from a policy transmitted from the headend upon resource connector gateway 116 enrollment with SSE 102. Resource connector gateway 116, upon initialization, initiates enrollment with SSE 102, thereby establishing a connection and facilitating the receipt of policies from the headend. These policies dictate the forwarding behavior of resource connector gateway 116, specifying the destinations for data packets based on the application's request from SSE 102. As a result, the resource connector gateway 116 dynamically adjusts its routing mechanism, assigning the correct DNS (private application 122) and underlying routes for data packets. This ensures smooth access to private application 122, which is concealed behind resource connector gateway 116, in compliance with the received policy.

As shown in FIG. 1, data packets received from SSE 102 via TLS/DTLS 106 may undergo IP address translation by NAT 108 before reaching ethernet interface 110 of host VM 112. Furthermore, resource connector gateway 116 has the capability to receive these data packets through an interaction facilitated by docker 114. Docker 114 is tasked with the deployment and management of applications or services accessible through the VPN client, utilizing the Ethernet interface 118 and virtual network interface 120. Upon analyzing the header to determine the destination, resource connector gateway 116 can transmit the data packets to private application 122.

Figure 2:
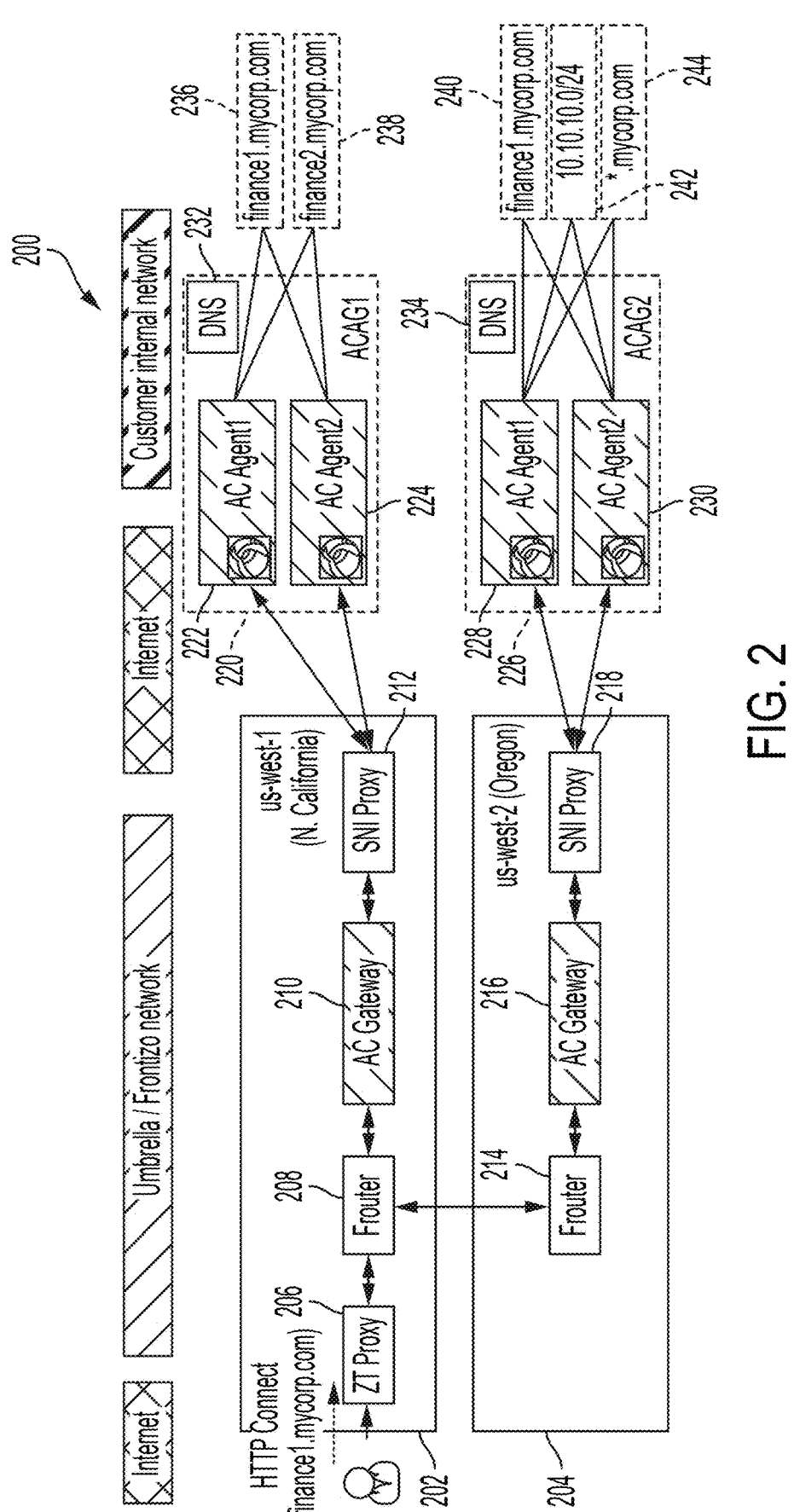
FIG. 2 illustrates an example system illustrating communications to access a private application in an enterprise network in accordance with some embodiments of the present technology.

FIG. 2 illustrates an example system 200 illustrating communications to access a private application in an enterprise network in accordance with some embodiments of the present technology.

For example, upon initialization, resource connector gateway 116 receives a policy/configuration from central management system that dictates the provisioning and definition of client application agents. The policy can further define configurations for private applications and resources utilizing Fully Qualified Domain Names (FQDNs), wildcards, or subnets, subsequently associating them with application connector gateway groups (ACAGs). Internally, a local application map to each ACAG is established, delineating weights and priorities and mapping each application to its corresponding ACAG. These ACAGs and the associated IP addresses are subsequently advertised to Frouter 208 and 214 to route data packets received.

For example, a mapping can facilitate secure connectivity when a user seeks to access a specific application (finance1.mycorp.com shown in FIG. 2) hidden behind the Application Connector Gateway (ACG). In an example, a user can initiate connectivity with a private application through zero trust (ZT) proxy 206. ZT proxy 206 serves as an intermediary between a user or client device and application 236, application 238, application 240, application 242 and application 244. ZT Proxy 206 further can enforce access policies, authenticate users, and inspect traffic to ensure security and compliance with access controls defined by the policies.

Upon receiving the user's request, the ZT proxy 206, equipped with an initial validation policy for authenticating user requests, can forward the request to a Frouter 208. Frouter 208 is responsible for routing or forwarding data packets. Acting as an intermediary, Frouter 208 can receive requests from ZT proxy 206 to determine the appropriate routing path for data packets associated with the request. The role of Frouter 208 involves efficiently directing network traffic, ensuring data reaches its intended destination securely and promptly within the network infrastructure. In FIG. 2, Frouter 208 acts as an intermediary that manages the routing of data packets associated with the request from the ZT proxy 206. Frouter 208 navigates the data packets from the initial request to the designated destination via the Resource connector gateway 210.

In some examples, Frouter 208, in the first region 202, may determine from the data packets that the private application intended to be accessed is associated with an ACAG in the second region 204. Frouter 208 in the first region 202 can subsequently transfer the data packets to Frouter 214 in the second region 204 to be managed by application connector gateway 216. The resource connector gateway 210 acts as an intermediary or gateway between client devices and the applications they intend to access. When Frouter 208 sends a request, the resource connector gateway 210 authenticates users, enforces access controls, and establishes secure connectivity to applications, regardless of their deployment model (such as on-premises, cloud-based, or hybrid).

When ZT proxy 206 sends data packets, Frouter 208 starts processing the user's request by requesting an IP address from DNS 232, 234 via the Resource connector gateway 210. This allows access to the private application associated with the request. Subsequently, Frouter 208 proceeds to relay both the data packets and the request to the Resource connector gateway 210. Notably, the IP address obtained from ZT proxy 206 corresponds to an AC agent associated with multiple applications, including application 236, application 238, application 240, application 242, and application 244. Resource connector gateway 210 maintains a comprehensive record of connected AC Agents (i.e., AC agent 222 and AC agent 2 224) and their respective ACAGs (i.e., 220) pertaining to each application.

Once the ACAG associated with the requested application is identified, the Resource connector gateway 210 sends the packet through the intermediary SNI proxy 212 to ACAG1 220. The SNI proxy 212 helps client devices communicate with servers based on the hostname indicated in the request header received from the Resource connector gateway 210. With this information, the SNI proxy 212 can forward the request to the appropriate destination server associated with ACAG1 220 and ACAG2 226. In the current example, the SNI proxy 212 forwards the data packet to ACAG1 220.

SNI proxy 212, in its acquaintance with ACAG1 220, acknowledges that ACAG1 220 encompasses two agents, AC agent 222 and AC agent 2 224 each having a dedicated tunnel facilitating communication with application 236 (finance1.mycorp.com) and application 238 (finance2.mycorp.com). The SNI proxy 212 directs the data packets to either AC agent 222 or AC agent 2 224 within the identified ACAG1 220 en route to application 236.

In an example, involving the use of Frouter 214 within the second region 204, a comparable process unfolds to that described earlier for accessing application 240, 242, or application 244. This process involves utilizing ACAG2 226, which comprises AC agent 1 228 and AC agent 2 230.

Figure 3:
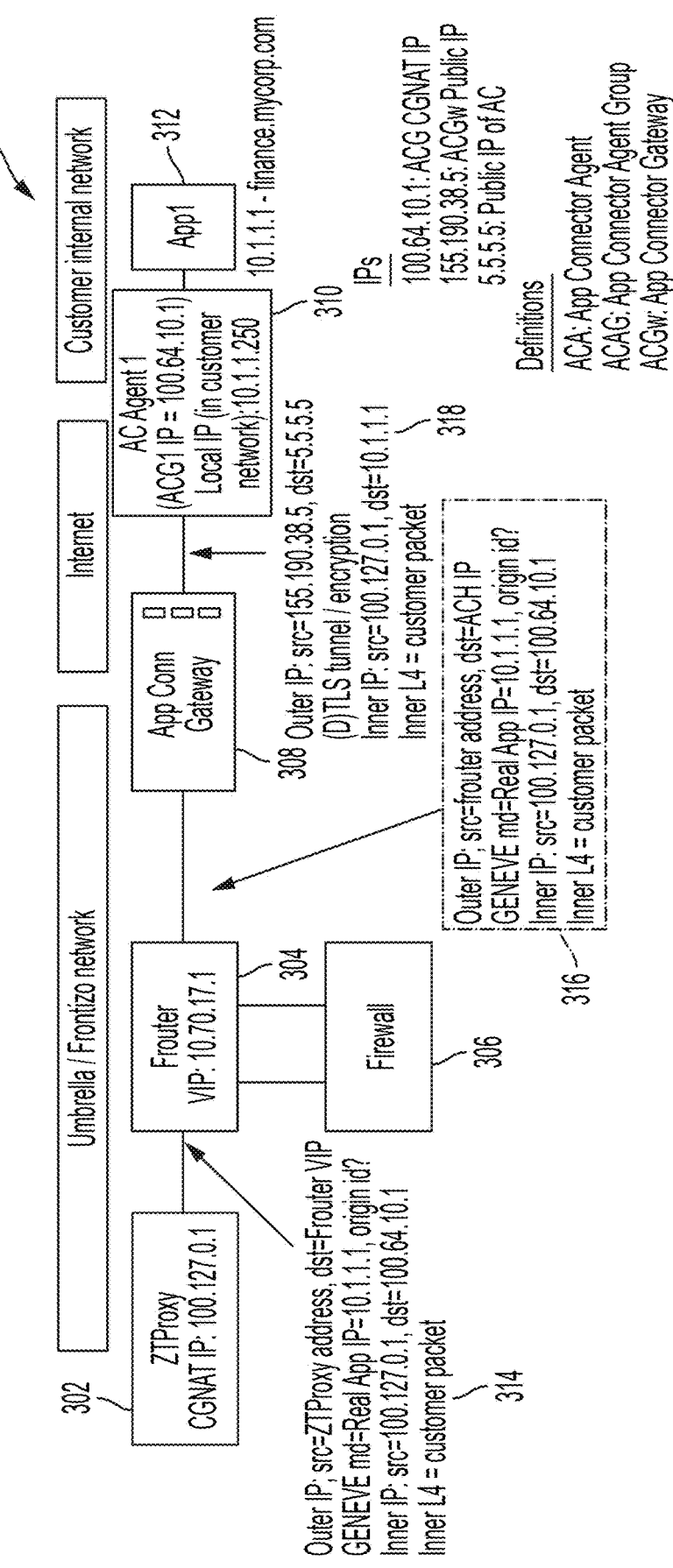
FIG. 3 illustrates a packet flow from a proxy in an SSE to an application in accordance with some embodiments of the present technology.

FIG. 3 illustrates a packet flow 300 from a proxy in an SSE to an application in accordance with some embodiments of the present technology.

As illustrated in FIG. 3, mirroring the discussion of FIG. 2, ZT proxy 302 is capable of receiving a client request. ZT proxy 302 subsequently forwards the request to Frouter 304, accompanied by a header specifying the intended destination, which denotes an application to be accessed. Notably, neither the client nor ZT proxy 302 possesses knowledge of the IP address associated with the target application 312. Within header 314, the inner IP address is delineated as "src=100.127.0.1, dst=100.64.10.1". Notably, the "dst" IP address specified in the header of the data packet corresponds to the IP address of the destination ACAG including ACA 310. The "src" IP address specified in the header corresponds to ZT proxy 302.

Once Frouter 304 receives the data packet, Frouter 304 routes the data packet to the firewall 306 prior to forwarding to resource connector gateway 308. When resource connector gateway 308 receives the data packet from Frouter 304, the resource connector gateway 308 identifies the destination of the data packet in the header 316 of the data packet. As shown in header 316, although the inner and outer IP address have remained the same, the outer IP address has been updated. The outer IP address notably indicates that the data packet source is Frouter 304, and the destination is "ACH IP".

Resource connector gateway 308 checks to verify if the data packet is a part of an existing data flow that a current is currently known. If the data packet is a part of a known data flow, the data packet is routed to the intended destination per the data flow. A resource connector gateway can identify if a data packet is part of an existing data flow by keeping a record of ongoing data flows. Whenever a new data packet arrives, the gateway compares certain attributes such as source and destination IP addresses, and other information included in headers of previous data packets received in various data flows. If the attributes match data received from a previously identified data packet in an identified data flow, indicating that the packet belongs to an existing communication session, the gateway recognizes the current data packet as part of the established data flow. Based on this recognition, the gateway can route the data packet accordingly without the need for additional processing or validation.

If resource connector gateway 308 determines that the data packet is a part of a new data flow, an ACA instance is selected in the corresponding ACAG, and a destination network address translation (DNAT) is performed to rewrite the destination IP address in header 316 of the data packet, with the IP address of application 312, noted as "10.1.1.1" in header 318. The data packet is subsequently routed with header 318 to the ACA 310 with a TLS/DTLS tunnel to application 312.

FIG. 4 illustrates an example process 400 for utilizing a VPN client acting as an ACA to provide access to an application located behind it. Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

According to some examples, the method includes registering with an SSE upon startup of the VPN client to receive a policy configuring the VPN client to operate as a forwarding agent at block 402. For example, the resource connector gateway 116, as depicted in FIG. 1, initiates registration with an SSE immediately upon the VPN client's startup. This registration prompts the reception of a policy that configures the VPN client to function as a forwarding agent. This policy is instrumental in designating both a DNS and a prescribed route for data packets to traverse. Concurrently, the resource connector gateway broadcasts one or more destination IP addresses linked to ACAs associated with various applications to a proxy within the SSE. Upon receiving a connection request to the application, the proxy inscribes the relevant destination IP addresses into the request header. Subsequently, a tunnel is established between the ACA and the resource connector gateway.

According to some examples, the method includes receiving via the resource connector gateway a data packet including a request comprising a header indicating an application as a destination of the data packet at block 404. For example, the resource connector gateway 116 illustrated in FIG. 1 may receive via the resource connector gateway a data packet including a request comprising a header indicating an application as a destination of the data packet. The header includes an IP address linked to an ACAG, configured to facilitate connectivity to the designated application. Within the domain name service configuration, the application is defined using a combination of FQDNs, wildcards, or subnets, thereby establishing its identity and mapping it to at least one ACAG housing multiple ACAs. Additionally, integrated within the resource connector gateway is an IP address allocator, meticulously tasked with preserving the IP addresses associated with one or more ACAGs. In response to the creation of additional ACAGs, the IP address allocator dynamically allocates at least one of the preserved ACAG IP addresses to the newly created ACAGs, ensuring seamless scalability and resource utilization.

According to some examples, the method includes determining at the resource connector gateway whether an existing flow exists to transmit the data packet to the ACAG at block 406. For example, the resource connector gateway 116 may ascertain whether an existing flow is present to facilitate the transmission of the data packet to the ACAG. Subsequently, at the resource connector gateway, a mapping to the ACAG is generated, delineating the route from a proxy situated at the resource connector gateway to the ACAG for the data packet to traverse. This mapping defines one or more weights and priorities concerning the ACAs within the ACAG, ensuring optimized routing and prioritization.

According to some examples, the method includes identifying the ACA in the ACAG in response to determining that the existing flow does not exist at block 408. For example, the resource connector gateway 116 illustrated in FIG. 1 may identify the ACA in the ACAG in response to determining that the existing flow does not exist. The IP address in the header is replaced with a second IP address specifically identifying the ACA as the intended recipient for routing the data packet. Identifying the ACAG is associated with the ACA entails the selection of one or more ACAs to fulfill the request. This selection process encompasses evaluating whether either of the ACAs has surpassed a predetermined load threshold. Furthermore, it involves recognizing scenarios where a destination application is nested behind multiple ACAGs. The selection of the ACAG is then determined based on the proximity of the ACAG to a proxy situated at the SSE, ensuring efficient routing based on geographic location.

According to some examples, the method includes routing the data packet through the tunnel along the route to the identified ACA in the ACAG at block 410. For example, the resource connector gateway 116 illustrated in FIG. 1 may route the data packet through the tunnel along the route to the identified ACA in the ACAG. The ACA within the ACAG routes the data packet to the application.

Figure 5:
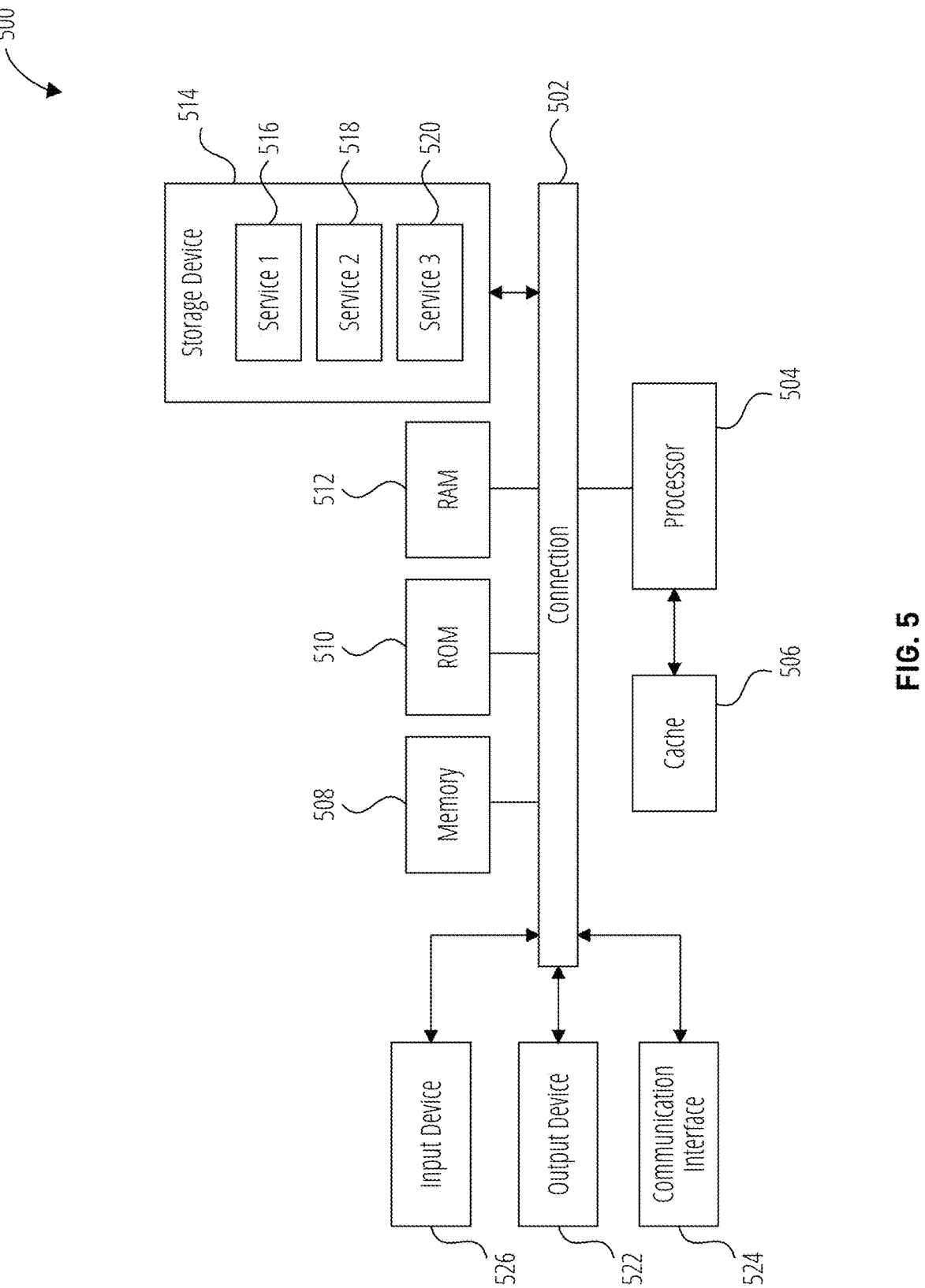
FIG. 5 shows an example of a system for implementing certain embodiments of the present technology.

FIG. 5 shows an example of computing system 500, which can be for example any computing device making up the resource connector gateway, Frouter, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) and connection 502 that couples various system components including system memory 508, such as read-only memory (ROM) 510 and random-access memory (RAM) 512 to processor 504. Computing system 500 can include a cache of high-speed memory 508 connected directly with, in close proximity to, or integrated as part of processor 504.

Processor 504 can include any general-purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain embodiments within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method for utilizing a virtual private network (VPN) client acting as an application connector (ACA) agent to provide access to an application located behind it, the method comprising: registering with a secure service edge (SSE) upon startup of the VPN client to receive a policy configuring the VPN client to operate as a forwarding agent, the policy designating a domain name system (DNS), and a route for data packets to follow, wherein a tunnel is created between the application connector (ACA) agent and an resource connector gateway; receiving via the resource connector gateway a data packet including a request comprising a header indicating the application as a destination of the data packet, wherein the header includes an Internet protocol (IP) address associated with an resource connector gateway group (ACAG) configured to enable connectivity to the application; determine at the resource connector gateway whether an existing flow exists to transmit the data packet to the ACAG; in response to determining that the existing flow does not exist, identifying the ACA in the ACAG, wherein the IP address in the header is replaced with a second IP address that identifies the ACA as an intended destination to route the data packet; and routing the data packet through the tunnel along the route to the identified ACA in the ACAG, wherein the ACA within the ACAG routes the data packet to the application.

Clause 2. The method of clause 1, wherein the application is configured at a domain name service using one or more of a fully qualified domain name (FQDN), wildcard, or subnets to identify the application, and map the application to at least one ACAG comprising of a plurality of ACAs.

Clause 3. The method of any of clause 1 to 2, further comprising: generating at the resource connector gateway a mapping to the ACAG defining the route from a proxy at the resource connector gateway to the ACAG for the data packet to follow, the mapping defining one or more weights and priorities with regards to one or more ACAs in the ACAG.

Clause 4. The method of any of clause 1 to 3 wherein the resource connector gateway further comprises an IP address allocator, the IP address allocator configured to: preserve one or more ACAG IP addresses; and in response to additional ACAGs being created assigning at least one of the ACAG IP addresses to the additional ACAGs.

Clause 5. The method of any of clause 1 to 4, further comprising: broadcasting to a proxy in the SSE one or more destination IP addresses associated with ACAs connected with one or more applications, wherein the proxy is configured to write the one or more destination IP addresses to the header in the request upon being provoked to connect to the application.

Clause 6. The method of any of clause 1 to 5, wherein identifying the ACAG associated with the ACA includes selecting one or more ACAs to serve the request, wherein the selecting includes determining whether either of the ACAs has exceeded a load threshold.

Clause 7. The method of any of clause 1 to 6, further comprising: determine that a destination application is nested behind multiple ACAGs; and selecting the ACAG based on a location of the ACAG in proximity to a proxy at the SSE.

Clause 8. A network device comprising: one or more memories having computer-readable instructions stored therein; and one or more processors configured to execute the computer-readable instructions to: register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector (ACA) agent and an resource connector gateway; receive via the resource connector gateway a data packet including a request comprising a header indicating an application as a destination of the data packet, wherein the header includes an Internet protocol (IP) address associated with an application connector gateway group (ACAG) configured to enable connectivity to the application; determine at the resource connector gateway whether an existing flow exists to transmit the data packet to the ACAG; in response to determining that an existing flow does not exist, identify the ACA in the ACAG, wherein the IP address in the header is replaced with a second IP address that identifies the ACA as an intended destination to route the data packet; and route the data packet through the tunnel along the route to the identified ACA in the ACAG, wherein the ACA within the ACAG routes the data packet to the application.

Clause 9. The network device of clause 8, wherein the application is configured at a domain name service using one or more of a fully qualified domain name (FQDN), wildcard, or subnets to identify the application, and map the application to at least one ACAG comprising of a plurality of ACAs.

Clause 10. The network device of any of clause 8 to 9, wherein the instructions further configure the network device to: generating at the resource connector gateway a mapping to the ACAG defining the route from a proxy at the resource connector gateway to the ACAG for the data packet to follow, the mapping defining one or more weights and priorities with regards to one or more ACAs in the ACAG.

Clause 11. The network device of any of clause 8 to 10, wherein the resource connector gateway further comprises an IP address allocator, the IP address allocator configured to: preserve one or more ACAG IP addresses; and in response to additional ACAGs being created assigning at least one of the ACAG IP addresses to the additional ACAGs.

Clause 12. The network device of any of clause 8 to 11, wherein the instructions further configure the network device to: broadcasting to a proxy in the SSE one or more destination IP addresses associated with ACAs connected with one or more applications, wherein the proxy is configured to write the one or more destination IP addresses to the header in the request upon being provoked to connect to the application.

Clause 13. The network device of any of clause 8 to 12, wherein identifying the ACAG associated with the ACA includes selecting one or more ACAs to serve the request, wherein the selecting includes determining whether either of the ACAs has exceeded a load threshold.

Clause 14. The network device of any of clause 8 to 13, wherein the instructions further configure the network device to: determine that a destination application is nested behind multiple ACAGs; and selecting the ACAG based on a location of the ACAG in proximity to a proxy at the SSE.

Clause 15. A non-transitory computer-readable storage medium comprising computer-readable instructions, which when executed by one or more processors of a network appliance, cause the network appliance to: register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector (ACA) agent and an resource connector gateway; receive via the resource connector gateway a data packet including a request comprising a header indicating an application as a destination of the data packet, wherein the header includes an Internet protocol (IP) address associated with an application connector gateway group (ACAG) configured to enable connectivity to the application; determine at the resource connector gateway whether an existing flow exists to transmit the data packet to the ACAG; in response to determining that the existing flow does not exist, identify the ACA in the ACAG, wherein the IP address in the header is replaced with a second IP address that identifies the ACA as an intended destination to route the data packet; and route the data packet through the tunnel along the route to the identified ACA in the ACAG, wherein the ACA within the ACAG routes the data packet to the application.

Clause 16. The non-transitory computer-readable storage medium of clause 15, wherein the application is configured at a domain name service using one or more of a fully qualified domain name (FQDN), wildcard, or subnets to identify the application and map the application to at least one ACAG comprising of a plurality of ACAs.

Clause 17. The non-transitory computer-readable storage medium of any of clause 15-16, wherein the computer-readable instructions further configure the network appliance to: generating at the resource connector gateway a mapping to the ACAG defining the route from a proxy at the resource connector gateway to the ACAG for the data packet to follow, the mapping defining one or more weights and priorities with regards to one or more ACAs in the ACAG.

Clause 18. The non-transitory computer-readable storage medium of any of clause 15-17, wherein the resource connector gateway further comprises an IP address allocator, the IP address allocator configured to: preserve one or more ACAG IP addresses; and in response to additional ACAGs being created assigning at least one of the ACAG IP addresses to the additional ACAGs.

Clause 19. The non-transitory computer-readable storage medium of any of clause 15-18, wherein the computer-readable instructions further configure the network appliance to: broadcasting to a proxy in the SSE one or more destination IP addresses associated with ACAs connected with one or more applications, wherein the proxy is configured to write the one or more destination IP addresses to the header in the request upon being provoked to connect to the application.

Clause 20. The non-transitory computer-readable storage medium of any of clause 15-19, wherein identifying the ACAG associated with the ACA includes selecting one or more ACAs to serve the request, wherein the selecting includes determining whether either of the ACAs has exceeded a load threshold.

Clause 21. The non-transitory computer-readable storage medium of any of clause 15-20, wherein the computer-readable instructions further configure the network appliance to: determine that a destination application is nested behind multiple ACAGs; and selecting the ACAG based on a location of the ACAG in proximity to a proxy at the SSE.

What is claimed is:

1. A method for utilizing a virtual private network client (VPN client) acting as an application connector agent (ACA) to provide access to an application located behind it, the method comprising:

registering with a secure service edge (SSE) upon startup of the VPN client to receive a policy configuring the VPN client to operate as a forwarding agent, the policy designating a domain name system (DNS), and a route for data packets to follow, wherein a tunnel is created between the ACA and a resource connector gateway;

receiving via the resource connector gateway a data packet including a request comprising a header indicating the application as a destination of the data packet, wherein the header includes an Internet protocol address (IP address) associated with an application connector gateway group (ACAG) configured to enable connectivity to the application;

determine at the resource connector gateway whether an existing flow exists to transmit the data packet to the ACAG;

in response to determining that the existing flow does not exist, identifying the ACA in the ACAG, wherein the IP address in the header is replaced with a second IP address that identifies the ACA as an intended destination to route the data packet; and routing the data packet through the tunnel along the route to the ACA identified in the ACAG, wherein the ACA within the ACAG routes the data packet to the application.

2. The method of claim 1, wherein the application is configured at a domain name service using one or more of a fully qualified domain name (FQDN), wildcard, or subnets to identify the application, and map the application to at least one ACAG comprising of a plurality of ACAs.

3. The method of claim 1, further comprising:

generating at the resource connector gateway a mapping to the ACAG defining the route from a proxy at the resource connector gateway to the ACAG for the data packet to follow, the mapping defining one or more weights and priorities with regards to one or more ACAs in the ACAG.

4. The method of claim 1 wherein the resource connector gateway further comprises an IP address allocator, the IP address allocator configured to:

preserve one or more ACAG IP addresses; and in response to additional ACAGs being created assigning at least one of the one or more ACAG IP addresses to the additional ACAGs.

5. The method of claim 1, further comprising:

broadcasting to a proxy in the SSE one or more destination IP addresses associated with ACAs connected with one or more applications, wherein the proxy is configured to write the one or more destination IP addresses to the header in the request upon being provoked to connect to the application.

6. The method of claim 1, wherein identifying the ACAG associated with the ACA includes selecting one or more ACAs to serve the request, wherein selecting the one or more ACAs includes determining whether either of the one or more ACAs has exceeded a load threshold.

7. The method of claim 1, further comprising:

determine that a destination application is nested behind multiple ACAGs; and selecting the ACAG based on a location of the ACAG in proximity to a proxy at the SSE.

8. A network device comprising:

one or more memories having computer-readable instructions stored therein;

one or more processors configured to execute the computer-readable instructions to:

register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector agent (ACA) and a resource connector gateway;

receive via the resource connector gateway a data packet including a request comprising a header indicating an application as a destination of the data packet, wherein the header includes an Internet protocol address (IP address) associated with an application connector gateway group (ACAG) configured to enable connectivity to the application;

determine at the resource connector gateway whether an existing flow exists to transmit the data packet to the ACAG;

in response to determining that the existing flow does not exist, identify the ACA in the ACAG, wherein the IP address in the header is replaced with a second IP address that identifies the ACA as an intended destination to route the data packet; and route the data packet through the tunnel along the route to the ACA identified in the ACAG, wherein the ACA within the ACAG routes the data packet to the application.

9. The network device of claim 8, wherein the application is configured at a domain name service using one or more of a fully qualified domain name (FQDN), wildcard, or subnets to identify the application, and map the application to at least one ACAG comprising of a plurality of ACAs.

10. The network device of claim 8, wherein the computer-readable instructions further configure the network device to:

generating at the resource connector gateway a mapping to the ACAG defining the route from a proxy at the resource connector gateway to the ACAG for the data packet to follow, the mapping defining one or more weights and priorities with regards to one or more ACAs in the ACAG.

11. The network device of claim 8, wherein the resource connector gateway further comprises an IP address allocator, the IP address allocator configured to:

preserve one or more ACAG IP addresses; and in response to additional ACAGs being created assigning at least one of the one or more ACAG IP addresses to the additional ACAGs.

12. The network device of claim 8, wherein the computer-readable instructions further configure the network device to:

broadcasting to a proxy in the SSE one or more destination IP addresses associated with ACAs connected with one or more applications, wherein the proxy is configured to write the one or more destination IP addresses to the header in the request upon being provoked to connect to the application.

13. The network device of claim 8, wherein identifying the ACAG associated with the ACA includes selecting one or more ACAs to serve the request, wherein selecting the one or more ACAs includes determining whether either of the one or more ACAs has exceeded a load threshold.

14. The network device of claim 8, wherein the computer-readable instructions further configure the network device to:

determine that a destination application is nested behind multiple ACAGs; and selecting the ACAG based on a location of the ACAG in proximity to a proxy at the SSE.

15. A non-transitory computer-readable storage medium comprising computer-readable instructions, which when executed by one or more processors of a network appliance, cause the network appliance to:

register with a secure service edge (SSE) upon startup of a VPN client to receive a policy configuring the VPN client to operate as a forwarding agent, the policy designating a domain name system (DNS), and a route for data packets to follow, wherein a tunnel is created between an application connector agent (ACA) and a resource connector gateway;

receive via the resource connector gateway a data packet including a request comprising a header indicating an application as a destination of the data packet, wherein the header includes an Internet protocol address (IP address) associated with an application connector gateway group (ACAG) configured to enable connectivity to the application;

determine at the resource connector gateway whether an existing flow exists to transmit the data packet to the ACAG;

in response to determining that the existing flow does not exist, identify the ACA in the ACAG, wherein the IP address in the header is replaced with a second IP address that identifies the ACA as an intended destination to route the data packet; and route the data packet through the tunnel along the route to the ACA identified in the ACAG, wherein the ACA within the ACAG routes the data packet to the application.

16. The non-transitory computer-readable storage medium of claim 15, wherein the application is configured at a domain name service using one or more of a fully qualified domain name (FQDN), wildcard, or subnets to identify the application and map the application to at least one ACAG comprising of a plurality of ACAs.

17. The non-transitory computer-readable storage medium of claim 15, wherein the computer-readable instructions further configure the network appliance to:

generating at the resource connector gateway a mapping to the ACAG defining the route from a proxy at the resource connector gateway to the ACAG for the data packet to follow, the mapping defining one or more weights and priorities with regards to one or more ACAs in the ACAG.

18. The non-transitory computer-readable storage medium of claim 15, wherein the resource connector gateway further comprises an IP address allocator, the IP address allocator configured to:

preserve one or more ACAG IP addresses; and in response to additional ACAGs being created assigning at least one of the one or more ACAG IP addresses to the additional ACAGs.

19. The non-transitory computer-readable storage medium of claim 15, wherein the computer-readable instructions further configure the network appliance to:

broadcasting to a proxy in the SSE one or more destination IP addresses associated with ACAs connected with one or more applications, wherein the proxy is configured to write the one or more destination IP addresses to the header in the request upon being provoked to connect to the application.

20. The non-transitory computer-readable storage medium of claim 15, wherein identifying the ACAG associated with the ACA includes selecting one or more ACAs to serve the request, wherein selecting the one or more ACAs includes determining whether either of the one or more ACAs has exceeded a load threshold.

* * * * *